March 22, 1966 G. B. BOOTH ET AL 3,241,358
VIBRATION TESTING APPARATUS
Filed Jan. 4, 1963 3 Sheets-Sheet 1

INVENTORS
GALT B. BOOTH
THOMAS C. WARNER, JR.
BY
Byerly, Townsend, Watson & Churchill
ATTORNEYS.

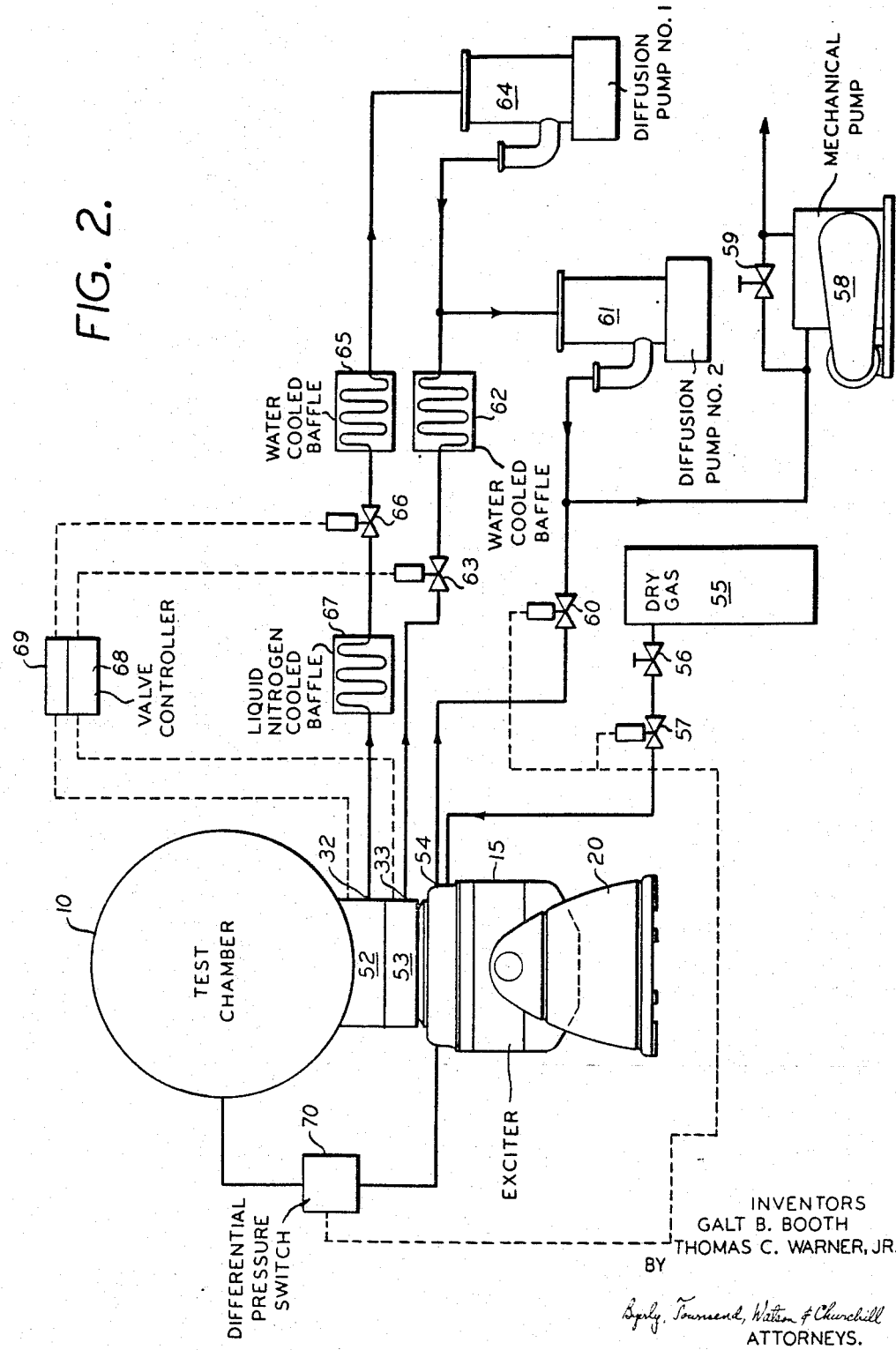

March 22, 1966  G. B. BOOTH ET AL  3,241,358
VIBRATION TESTING APPARATUS
Filed Jan. 4, 1963  3 Sheets-Sheet 3
FIG. 3.
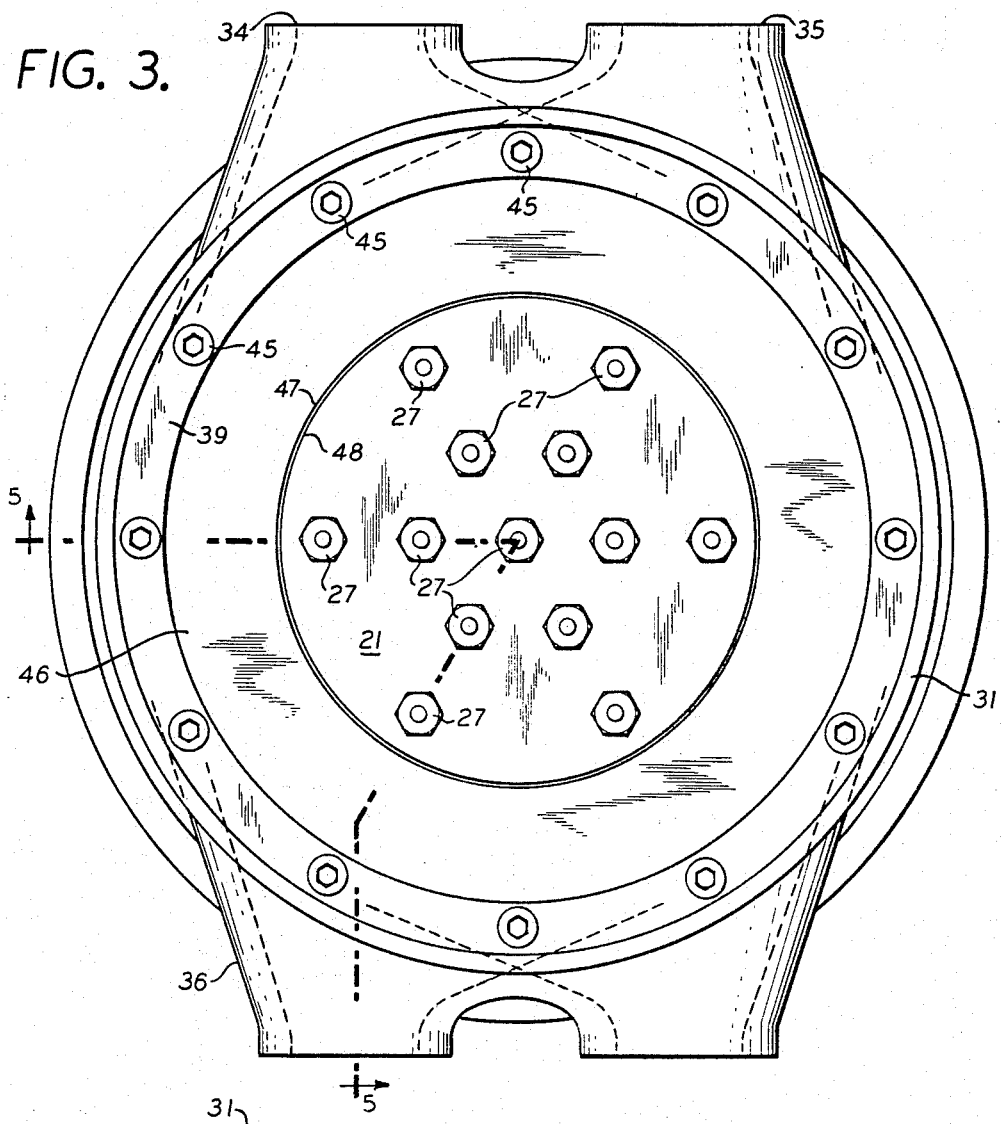
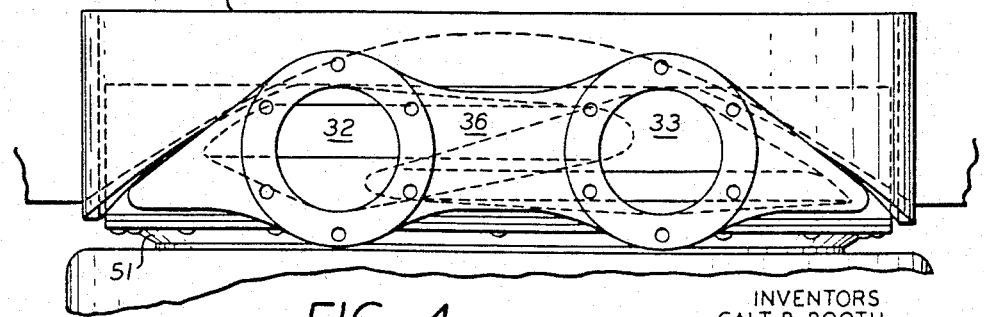
FIG. 4.
INVENTORS
GALT B. BOOTH
THOMAS C. WARNER, JR.
BY
Byerly Townsend, Watson & Churchill
ATTORNEYS.

3,241,358
VIBRATION TESTING APPARATUS
Galt B. Booth, Branford, and Thomas C. Warner, Jr., West Haven, Conn., assignors to Textron Electronics, Inc., Providence, R.I., a corporation of Delaware
Filed Jan. 4, 1963, Ser. No. 249,382
11 Claims. (Cl. 73—71.6)

The present invention relates to the field of environmental testing and to an arrangement particularly suited for but not limited to vibration testing of specimens under conditions simulating the environment of outer space and the fringes thereof.

It is now known that materials of construction and structures made therefrom behave quite differently in the vacuum of space than they do on earth. Many materials undergo molecular changes under high vacuum conditions; and it is important to investigate these changes thoroughly before selecting the materials for use on space vehicles.

A space vehicle in transit from earth to outer space and back is subjected to rapid changes in pressure from the normal atmospheric level at the earth's surface to the almost perfect vacuum of space. It is subjected to extremes of vibration caused by the buffeting of the air through which it passes, the natural vibration of the engine, and the like; and it experiences a wide range of temperatures. In order to explore these effects in the laboratory use is made of an environmental test chamber and equipment for reproducing within the chamber both the temperature and pressure conditions to be encountered.

With respect to vibration effects, these are induced in a specimen by a vibration exciter. The most common form now in use is of the electrodynamic type. A limited range of testing can be performed with the exciter located within the test chamber. However, as lower pressures are sought and/or extreme temperatures, the exciter itself is subject to failure and becomes a limiting factor.

A typical problem arises out of the presence of rubber seals on those exciters which because of their capacity require oil cooling. Rubber is a victim of excessive outgassing as pressures drop below about $10^{-4}$ millimeters of mercury. Since this pressure corresponds to an altitude in the neighborhood of 400,000 feet, it will be appreciated that testing is severely handicapped. Add to this the fact that almost all plastics outgas considerably at low pressure and that the flexing characteristics and flex life even of metals are changed under the conditions of outer space and it will be appreciated why operating facilities capable of simultaneous vibration-altitude testing at simulated altitudes above 250,000 feet are presently unknown. Hence, it becomes absolutely necessary to find some way of locating the exciter outside of the chamber while communicating its output through the chamber wall.

It is, therefore, an object of the present invention to provide an arrangement for dynamically penetrating the wall of an environmental test chamber without restricting the chamber capacity.

In accordance with the present invention an arrangement is provided for enabling an extension of the table of a vibration exciter having a body and a table to pass operatively through the wall of an environmental test chamber from the exterior to the interior without swamping the vacuum pumping equipment for the chamber at chamber pressures of the order of a small fraction of a millimeter of mercury, the arrangement comprising means providing an opening in the wall of the chamber for receiving therethrough the extension of the table with a small gap therebetween, the wall-to-wall dimension of the gap being substantially less than the mean free path of gas molecules at pressures of the order of a small fraction of a millimeter of mercury, and external housing means joined to the wall of the chamber and extending therefrom around the opening therein for bridging the space between the wall and the exciter body to provide an enclosure for the extension of the table, the housing means including means for joining it to the exciter body with an hermetic seal, and means for enabling its interior to be evacuated independently of the chamber when the extension of the table is in operative position.

The invention herein is based upon the principle that in the high vacuum region, gas flow through a channel is not governed by Poisuille's law which applies to the viscous flow of gases. Flow becomes a function of the rate at which molecules strike the walls of the passage rather than a function of the rate at which they collide with each other. This occurs at low pressures when the mean free paths of molecules are greater than the wall to wall dimension of the channel through which they flow. The term "molecular flow" is generally applied to flow under these conditions.

The invention will be better understood after reading the following detailed description of specific embodiment thereof with reference to the appended drawings wherein:

FIGURE 2 is a schematic diagram of the coupling arrangement of FIGURE 1 showing the auxiliary pumping system required;

FIGURE 3 is a top plan view of the extension of the table of the exciter with its housing;

FIGURE 4 is a side elevational view of the structure of FIGURE 3 showing the duct openings for connecting the pumping system.

Figure 1:
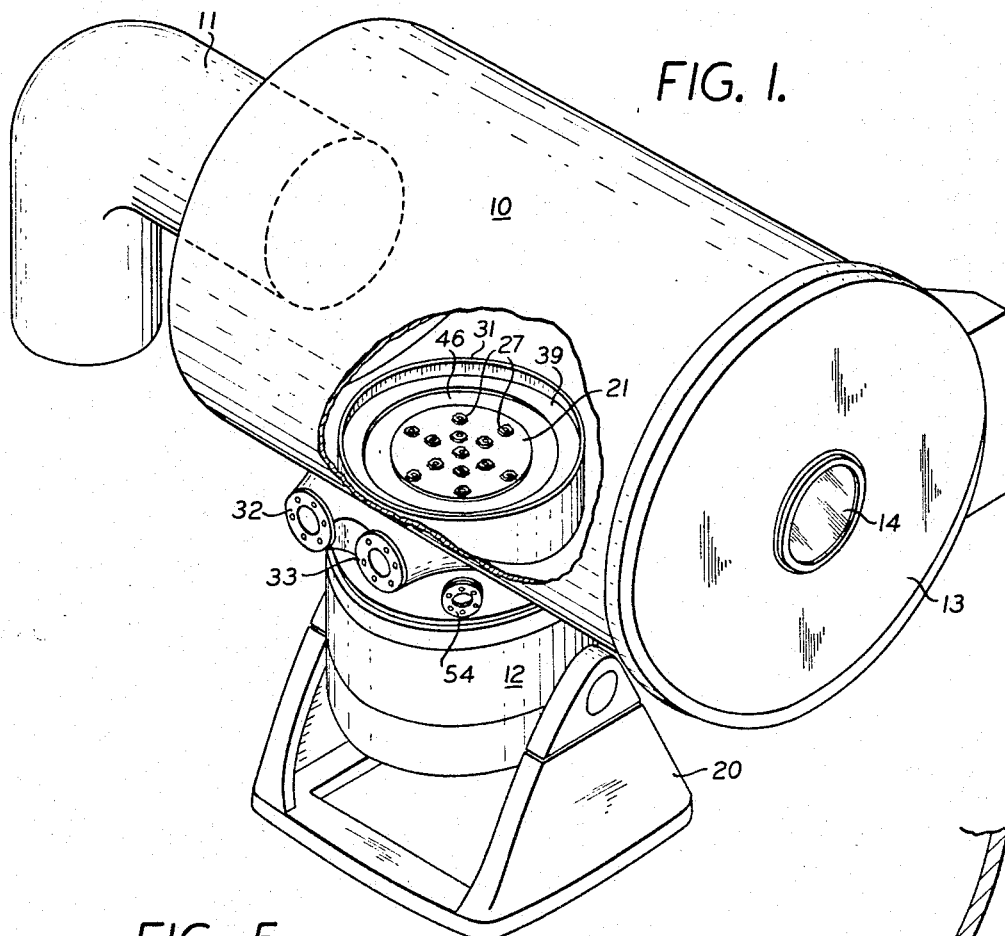
FIGURE 1 is a simplified perspective view of an environmental test chamber and a vibration exciter with portions broken away to show details of the arrangement for coupling the two in accordance with the invention.

Referring now to the drawings wherein the same reference numerals are used throughout to designate the same or equivalent parts, an environmental test chamber 10 with a duct 11 for coupling it to evacuation equipment (not shown) is shown coupled to a vibration exciter 12. The chamber 10 has an access door 13 provided with an observation panel 14.

Figure 5:
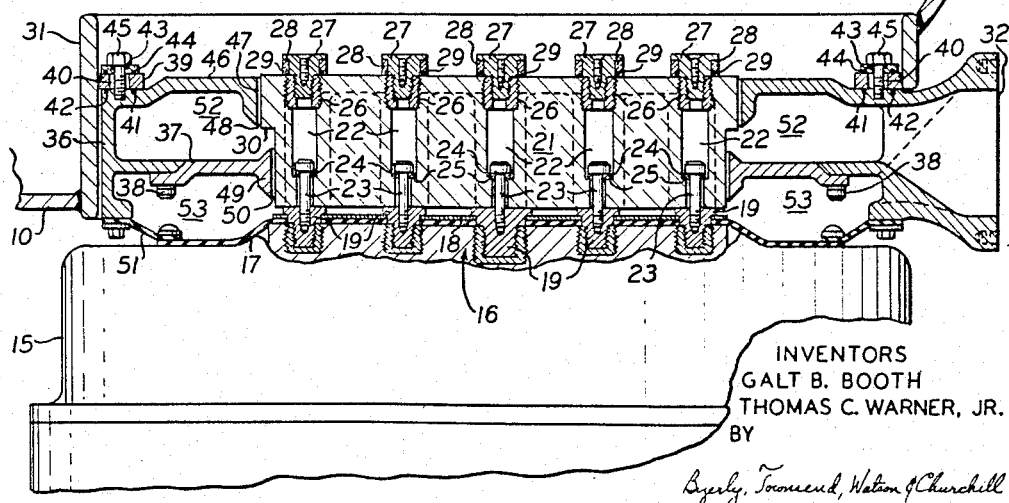
FIGURE 5 is a partial sectional view taken along line 5—5 in FIGURE 3.

The exciter is of the electrodynamic type having a body 15 and a driven table 16 (see FIGURE 5). The body 15 is entirely enclosed in its own housing and the annular space between the body and table 16 is sealed by a rubber or other suitable diaphragm 17. As shown, this diaphragm extends over the entire top of the table 16 and is reinforced by a stainless steel plate 18. In a typical construction the table 16 is made out of aluminum or magnesium for lightness in weight and provided with a plurality of steel mounting bushings 19. The exciter body 15 is mounted on a trunion base 20, best seen in FIGURE 2.

The exciter as described so far is conventional. In accordance with the invention the table 16 is extended by means of a removable extension 21 also fabricated from a light metal. To further reduce its weight it may be suitably cored in known manner. The extension is provided with through bolt holes 22 which mate with the bushings 19 in the table 16. Bolts 23 provided with protective washers 24 engage the shoulders 25 in the holes 22 to secure the extension to the table 16. The upper ends of holes 22 are enlarged to receive an insert 26 of harder material such as steel which has internal threads to receive a set of steel mounting bushings 27. Metal retaining rings 28 enclosing O-rings 29 are disposed under the heads of the bushings to seal off the holes 22 from the interior of the test chamber 10. The diameter of the extension is stepped at 30 for a reason to be explained later.

A stainless steel adapted flange 31 is welded directly into a precut hole in the wall of chamber 10. The cylindrical shape reinforces the opening in the chamber wall so as to maintain its structural integrity. The adapter flange is relieved as necessary (see FIGURE 4) to clear the ports 32, 33, 34 and 35 on the housing 36. The housing 36 is preferably machined from a stainless steel casting. It is made with a removable partition 37 held in place by bolts 38 in order to facilitate machining and polishing of all surfaces exposed to high vacuum. An internal flange ring 39 is welded to the adapter flange 31 for attaching the housing 36. Oversize bolt holes 40 permit easy alignment of the housing 36 with the extension 21 of the table. Two O-ring or packing seals 41 and 42 extend around the entire housing 36 under the flange ring 39 as shown. In addition, a metal ring with O-rings 43 and 44 is placed under each of the bolts 45 to isolate the test chamber from bolt threads and other possible sources of excessive outgassing.

It will be seen that the upper wall 46 of the casting is provided with an opening 47 for receiving the enlarged diameter portion of the extension 21 with a small gap 48 therebetween. The wall-to-wall dimension of this gap is made substantially less than the mean free path of gas molecules at pressures of the order of a small fraction of a millimeter of mercury.

Assuming that the mean free path of the air molecules is given by the equation $$L = 7 \times 10^{-6} \frac{p_0}{p}$$

where $L$ = the mean free path
$p_0$ = atmospheric pressure
$p$ = operating pressure it will be seen that the mean free path is 53.2 cm. at $1 \times 10^{-4}$ mm. of Hg and 532 cm. at $1 \times 10^{-5}$ mm. of Hg. The flow will be molecular if L exceeds the wall-to-wall dimension by a factor of 10. A wall-to-wall dimension of 0.030″ or 0.076 cm. is good practical figure since the stability of the moving element of presently available exciters is adequate for operation through an opening with such small clearance. It is desirable to make the gap as small as practical in order to achieve maximum operating efficiency.

In similar manner the partition 37 is provided with an aperture 49 aligned with opening 47 but of reduced diameter to receive the reduced diameter portion of extension 21 with a small gap 50. The wall-to-wall dimension of gap 50 is preferably of the same order of magnitude as the dimension of gap 48 and may, in fact, be of the same size.

A flexible rubber or other elastomeric sealing ring 51 is bolted to the lower edge of the housing 36 for joining it to the exciter body 15 with an hermetic seal. The reason for making ring 51 resilient or flexible is to isolate the wall of the chamber 10 from vibrations developed in the exicter body 15.

It will be seen that the housing 36 with its upper wall 46 and partition 37 cooperate with the extension 21 of the exciter table to form two annular compartments 52 and 53 adjacent and remote from the chamber 10, respectively. Compartment 52 communicates with ports 32 and 35 while compartment 53 communicates with ports 33 and 34. These ports are provided in pairs on both sides of the housing 36 for a number of reasons among which are: convenience in installation of the necessary pumping equipment, facility for paralling pumping equipment for improved performance, and means for connecting instrumentation. For the purpose of the ensuing discussion it may be assumed that ports 34 and 35 are appropriately sealed.

Since the extension 21 is virtually sealed within the chamber 10 in its operative position it will be appreciated that a vacuum in the chamber will tend to suck in the extension 21 and table 16. In order to balance at least a substantial portion of this vacuum created force it is necessary that the exciter body be sealed and itself evacuated to a relatively low pressure. For this purpose the body 15 is provided with at least two ports, one of which is shown in FIGURE 1 at 54. Port 54 is connected to the vacuum pumping system while the port not shown is connected to a supply of dry gas. As will be explained, this enables the pressure within the exciter to be maintained as closely as possible within ±1 p.s.i. of chamber pressure as the pressure in the chamber is lowered or raised.

For this example, it may be assumed that the exciter contains circulating oil for cooling. Due to the vapor pressure of the oil the pressure within the exciter can only be reduced to about $1 \times 10^{-2}$ mm. of Hg.

Assuming that the exciter table 16 has a diameter of 14″, the diaphragm 17 will have an exposed area of about 160 sq. in. while the flexible seal 51 may have an exposed area of about 106 sq. in. It can be shown that the total outgassing from the rubber at a pressure of $1 \times 10^{-4}$ mm. of Hg will approximate 171 liters per second. Known diffusion pumping equipment has the capacity to handle this volume at the pressure in question.

Assuming that the gaps 48 and 50 have a wall-to-wall dimension of .076 cm. and an axial length of about 3.8 cm. it can be shown that the leakage from compartment 53 at a pressure of $1 \times 10^{-4}$ mm. of Hg into compartment 52 at a pressure of $1 \times 10^{-5}$ mm. of Hg will be less than 50 liters per second. In the same manner, if the chamber pressure is $1 \times 10^{-6}$ mm. of Hg then the leakage into it will approximate 50 liters per sec. At a chamber pressure of $1 \times 10^{-7}$ mm. of Hg the leakage will increase in volume to about 500 liters per sec. These figures should provide some guide to what can be achieved with known pumping equipment and employing this invention.

Referring now to FIGURE 12 there is shown schematically a pumping system for obtaining the desired pressures in the exciter and in the compartments 52 and 53. Plumbing is shown in heavy lines while electrical or physical connections are shown by broken lines. A source of dry gas such as air or nitrogen in container 55 is coupled through a manual valve 56 and a solenoid controlled valve 57 to the shaker through a suitable port similar to port 54.

An electrically driven mechanical pump 58 provided with the usual bypass line controlled by manual valve 59 is coupled through a solenoid controlled valve 60 to port 54 in the exciter. It is also connected through a branch line to a diffusion pump 61 for which it acts as a fore pump. The suction side of pump 61 is connected through a water cooled baffle 62 and a solenoid controlled valve 63 to port 33 of compartment 53. A branch connection from pump 61 is connected to a second diffusion pump 64 for which it acts as a fore pump. Finally, the suction side of pump 64 is connected through a water cooled baffle 65, a solenoid controlled valve 66, a liquid nitrogen cooled baffle 67, and port 32 to compartment 52.

Valves 63 and 66 are electrically connected through valve controllers or pressure sensitive switches 68 and 69, respectively, to compartments 53 and 52. The extra ports 34 and 35 may be used for this purpose.

Valves 57 and 60, one normally open the other normally closed, are connected in parallel to a differential pressure switch 70 which, in turn, is coupled both to the chamber 10 and to the interior of the exciter in any suitable manner. The arrangement should be such that valve 57 is closed and valve 60 opened when the pressure in the chamber is less than the pressure in the exciter and vice versa when the relative pressures are transposed.

The valve controller 68 should be arranged to open valve 63 when the pressure in compartment 53 drops below about $1 \times 10^{-1}$ mm. of Hg. Likewise, valve controller 69 should open valve 66 when the pressure in compartment 52 falls below about $1 \times 10^{-3}$ mm. of Hg. Although not shown, it should be understood that the usual temperature and pressure responsive safety and control devices will be provided for the diffusion pumps in accordance with standard practice.

The baffle 62 prevents back streaming of vapor from diffusion pump 61 while baffles 65 and 67 perform the same function for pump 64 while increasing the pumping speed for any condensible vapor in compartment 52.

With the system described herein the operation of the auxiliary pumping equipment will be controlled as a function of chamber pressure. Thus, after pumping of the chamber is initiated, differential pressure switch 70 will respond to a 1 p.s.i. drop in chamber pressure to open valve 60 and close valve 57. These valves will be cycled by switch 70 to maintain the pressure within the exciter within 1 p.s.i. of the chamber pressure until the limit of $1 \times 10^{-2}$ mm. of Hg is reached in the exciter.

As the chamber pressure drops, the pressures in compartments 52 and 53 will also drop due to leakage into the chamber. When compartment 53 pressure reaches $1 \times 10^{-1}$ mm. of Hg, valve 63 is opened and the compartment is exhausted by pump 61. When the pressure in compartment 52 reaches $1 \times 10^{-3}$ mm. of Hg, valve 66 opens bringing pump 64 into play. Pumping continues until the limit of the pumping facility is attained. As previously mentioned, compartments 52 and 53 approach $1 \times 10^{-5}$ and $1 \times 10^{-4}$ mm. of Hg pressure, respectively.

When the chamber pressure is raised the cycle reverses as will be understood.

From the foregoing it will be observed that molecular flow occurs from compartment 53 through gap 50 into compartment 52. By providing the step 30 in extension 21 the gaps are offset so as to avoid a straight line path from gap 50 to gap 48. This is intended to reduce the leakage into the chamber 10.

The invention has been described with reference to a specific embodiment thereof. However, it should be understood that numerous changes may be made in the structure without departing from the true spirit of the invention as defined in the appended claims.

What is claimed is:

1. An arrangement for enabling an extension of the table of a vibration exciter having a body and a table to pass operatively through the wall of an environmental test chamber from the exterior to the interior without swamping the vacuum pumping equipment for the chamber at chamber pressures of the order of a small fraction of a millimeter of mercury, said arrangement comprising housing means which includes a wall portion provided with a first aperture therein for receiving therethrough said extension of the table with a small gap therebetween, said aperture being dimensioned relative to said extension such that the wall-to-wall dimension of said gap is substantially less than the mean free path of gas molecules at pressures of the order of a small fraction of a millimeter of mercury, means for joining said housing means with an hermetic seal externally to said wall of the chamber over an opening in said chamber wall with said first aperture aligned with said opening, said housing means having further portions which extend from said wall portion for bridging the space between said chamber wall and said exciter body to provide an enclosure for said extension of the table, said further portions of the housing means defining a second opening spaced from and aligned with said first aperture for admitting therethrough said table with its extension, means for joining said further portions to said exciter body with an hermetic seal around said second opening, and means for enabling the interior of said housing means to be evacuated independently of said chamber when said extension of the table is in operative position.

2. A second arrangement according to claim 1, wherein said housing means comprises an internal partition having an aperture therein which is aligned with said first aperture and through which said extension of the table can pass with a small gap therebetween before passing through said first aperture, the wall-to-wall dimension of said last mentioned gap being of the same order of magnitude as the dimension of said first mentioned gap, said partition cooperating with said extension of the table when the latter is in operative position for dividing the interior of the housing means into two compartments, and means for enabling said compartments to be evacuated independently of each other and of said chamber.

3. An arrangement according to claim 2, wherein vacuum pumping equipment is coupled to said compartments through independent ducting, said equipment having at least the capacity to reduce the pressures within said compartments to values such that the leakage into the chamber from the adjacent compartment is limited to a fraction of the capacity of the chamber pumping equipment, and the leakage into said adjacent compartment from the remote compartment is limited to less than the capacity of the pumping equipment for said adjacent compartment.

4. An arrangement according to claim 3, wherein the vacuum pumping equipment for said compartments is arranged, when the chamber is to be pumped down to a pressure of the order of $1 \times 10^{-6}$ millimeters of mercury or less, to reduce the pressure in said adjacent and remote compartments to pressures, respectively, of approximately the order of $1 \times 10^{-5}$ and $1 \times 10^{-4}$ millimeters of mercury.

5. An arrangement for providing an environmental test chamber with a vibration test facility comprising a vibration exciter having a body and a table, said table being provided with an extension, housing means which includes a wall portion provided with a first aperture therein for receiving therethrough said extension of the table with a small gap therebetween, said aperture being dimensioned relative to said extension such that the wall-to-wall dimension of said gap is substantially less than the mean free path of gas molecules at pressures of the order of a small fraction of a millimeter of mercury, means for joining said housing means with an hermetic seal externally to the wall of said chamber over an opening in said chamber wall with said first aperture aligned with said opening, said housing means having further portions which extend from said wall portion for bridging the space between said chamber wall and said exciter body to provide an enclosure for said extension of the table, said further portions of the housing means defining a second opening spaced from and aligned with said first aperture for admitting therethrough said table with its extension, means for joining said further portions to said exciter body with an hermetic seal around said second opening, and means for enabling the interior of said housing means to be evacuated independently of said chamber when said extension of the table is in operative position.

6. An arrangement according to claim 5, wherein said extension of the table comprises a structure removably attachable to said table.

7. An arrangement according to claim 5, wherein said housing means comprises an internal partition having a second aperture therein which is aligned with said first aperture and through which said extension of the table can pass with a small gap therebetween before passing through said first aperture, the wall-to-wall dimension of said last mentioned gap being of the same order of magnitude as the dimension of said first mentioned gap, said gaps being offset in the transverse direction relative to each other in order not to provide a straight-line path therethrough, said partition cooperationg with said extension of the table when the latter is in operative position for dividing the interior of the housing means into two compartments, and means for enabling said compartments to be evacuated independently of each other and of said chamber.

8. An arrangement according to claim 5, wherein the interior of said vibration exciter is itself hermetically sealed, table being joined to the body by a flexible diaphragm, and means are provided for reducing the pressure within the exciter to balance a substantial proportion of the suction forces that act upon the table due to chamber pressure.

9. An arrangement according to claim 8, wherein the means for reducing the pressure within the exciter is arranged to reduce such pressure to a value of the order of $1 \times 10^{-2}$ millimeters of mercury.

10. An arrangement for providing an environmental test chamber with a vibration test facility comprising an hermetically sealed vibration exciter having a body and a table movably mounted on said body by a suspension including a flexible diaphragm seal, said table being provided with an extension, housing means which includes a wall portion provided with a first aperture therein for receiving therethrough said extension of the table with a small gap therebetween, said aperture being dimensioned relative to said extension such that the wall-to-wall dimension of said gap is substantially less than the mean free path of gas molecules at pressures of the order of a small fraction of a millimeter of mercury, means for joining said housing means with an hermetic seal externally to said wall of the chamber over an opening in said chamber wall with said first aperture aligned with said opening, said housing means having further portions which extend from said wall portion for bridging the space between said chamber wall and said exciter body to provide an enclosure for said extension of the table, said further portions of the housing means defining a second opening spaced from and aligned with said first aperture for admitting therethrough said table with its extension, means for joining said further portions to said exciter body with an hermetic seal around said second opening, an internal partition within said housing means having a second aperture therein which is aligned with said first aperture and through which said extension of the table passes with a small gap therebetween before passing through said first aperture, the wall-to-wall dimension of said last mentioned gap being of the same order of magnitude as the dimension of said first mentioned gap, said partition cooperating with said extension when the latter is in operative position for dividing the interior of the housing means into two compartments, and vacuum pumping equipment coupled to the interior of said exciter and to each of said compartments by independent ducting, said equipment having at least the capacity to reduce the pressures within said compartments and said exciter to values such that the leakage into a chamber from the adjacent compartment is limited to a friction of the capacity of the chamber pumping equipment, the leakage into said adjacent compartment from the remote compartment is limited to less than the capacity of the pumping equipment for said adjacent compartment, and a substantial proportion of the suction forces acting upon the table due to chamber pressure will be counteracted.

11. An arrangement according to claim 10, wherein the vacuum pumping equipment is arranged, when the chamber is to be operated at a pressure of the order of $1 \times 10^{-6}$ millimeters of mercury or less, to reduce the pressure in said exciter to a pressure of the order of $1 \times 10^{-2}$ millimeters of mercury and to reduce the pressure in said adjacent and remote compartments to pressures, respectively, of the order of $1 \times 10^{-5}$ and $1 \times 10^{-4}$ millimeters of mercury.

References Cited by the Examiner
UNITED STATES PATENTS 3,049,913   8/1962   Hunt _____ 73—71.6

OTHER REFERENCES

J. D. Newton: MB Vibration Notebook, published by MB Mfg. Co. of New Haven, Conn., February 1959 issue, pages 6 and 7.

RICHARD C. QUEISSER, *Primary Examiner.*
JOHN P. BEAUCHAMP, *Examiner.*